(12) United States Patent
Amitay

(10) Patent No.: US 6,784,811 B1
(45) Date of Patent: Aug. 31, 2004

(54) SYSTEM AND A METHOD FOR AN ULTRA-LOW DELAY MPEG-SYNTAX VIDEO CODEC

(75) Inventor: Amichay Amitay, Rishon Lezion (IL)

(73) Assignee: Scopus Network Technologies Ltd., Rosh Ha'ayin (IL)

( * ) Notice: Subject to any disclaimer, the term of this patent is extended or adjusted under 35 U.S.C. 154(b) by 0 days.

(21) Appl. No.: 10/402,144

(22) Filed: Mar. 31, 2003

(51) Int. Cl.[7] .............................................. H03M 7/00
(52) U.S. Cl. .............................. 341/50; 341/51; 341/60
(58) Field of Search .............................. 341/50, 51, 60; 386/110

(56) References Cited

U.S. PATENT DOCUMENTS

| | | | | |
|---|---|---|---|---|
| 5,594,660 A | * | 1/1997 | Sung et al. | ............... 715/500.1 |
| 6,002,440 A | * | 12/1999 | Dalby et al. | ................. 386/110 |

* cited by examiner

*Primary Examiner*—Michael Tokar
*Assistant Examiner*—Lam Mai
(74) *Attorney, Agent, or Firm*—Edward Langer; Shiboleth, Yisraeli, Roberts, Zisman & Co.

(57) ABSTRACT

A system for compressed digital video bitstreams, in which an I-frame may precede a plurality of P-frames slices, wherein the system includes an encoder to encode the bits for each successive P-frame slice. The system also includes a decoder buffer, where the bits enter at a fixed rate and a decoder, which uses the extracted bits to decode each frame and display each frame. The delay is chosen at a fixed rate between 10 msec and 100 msec.

8 Claims, 6 Drawing Sheets

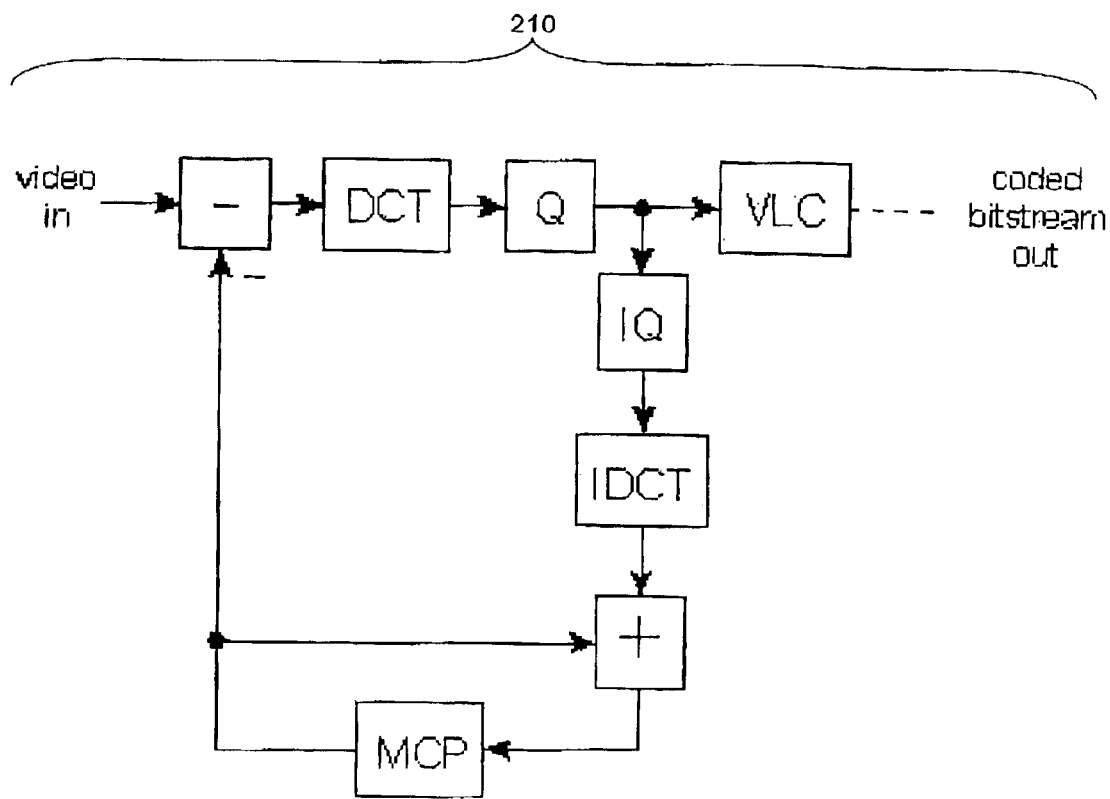
Prior art Fig. 2a
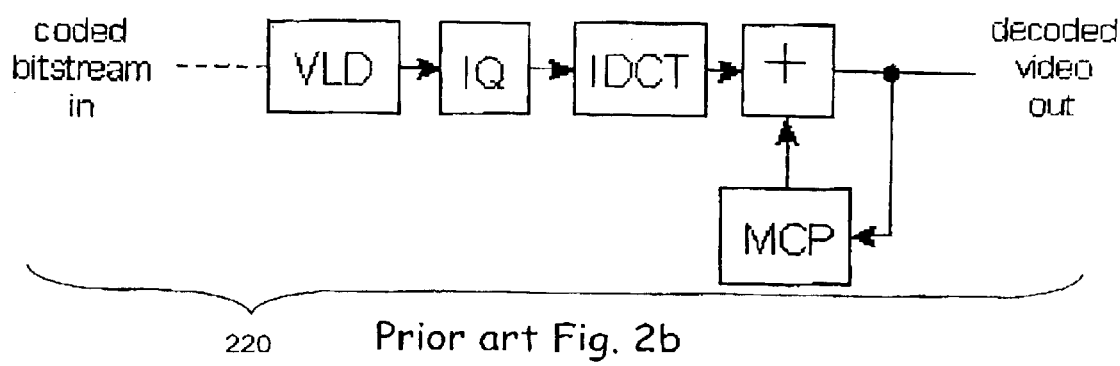
Prior art Fig. 2b

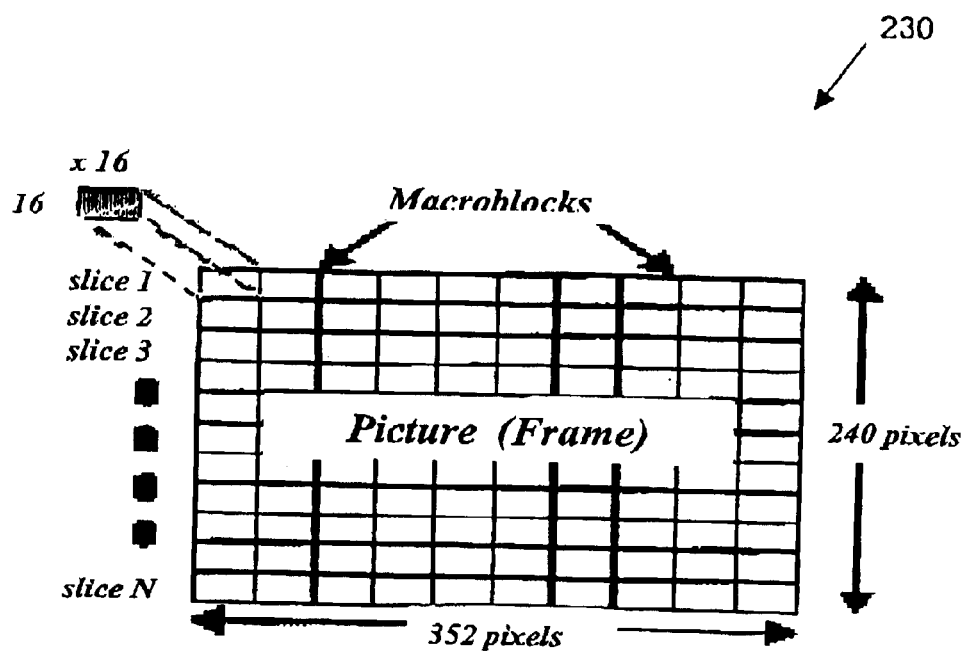
Prior art Fig. 2c
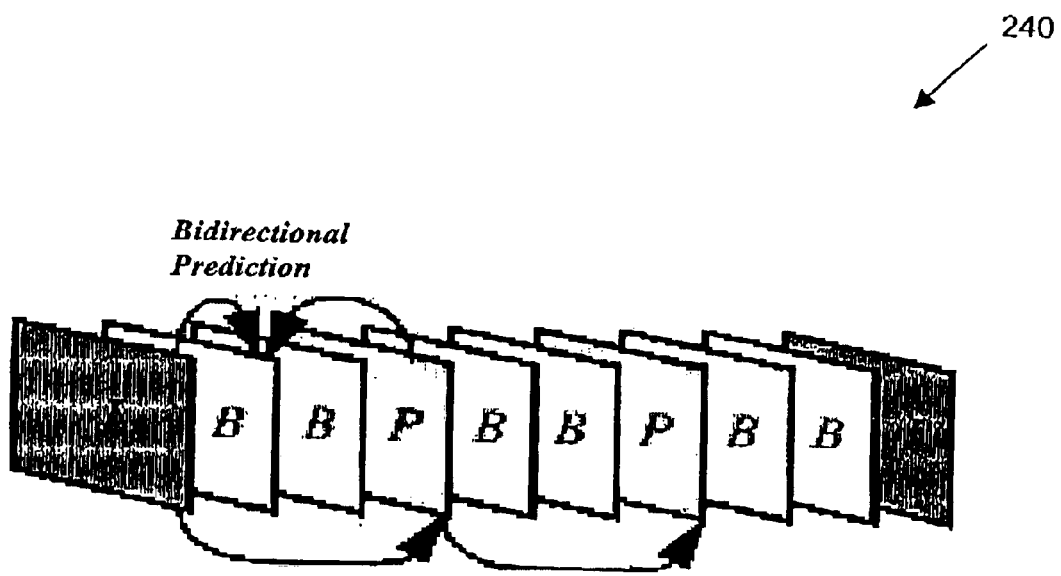
Prior art Fig. 2d

SYSTEM AND A METHOD FOR AN ULTRA-LOW DELAY MPEG-SYNTAX VIDEO CODEC

FIELD OF THE INVENTION

The present invention relates to systems for MPEG-2 video bitstreams. More particularly, the present invention relates to a system and method for an ultra-low delay MPEG-syntax video codec.

BACKGROUND OF THE INVENTION

The Moving Picture Experts Group (MPEG)-2 standard is commonly used for transmission of high quality video in many applications, especially for digital video broadcasting. This standard uses effective compression methods for reducing the temporal and spatial redundancy existing in video sequences. This is done with tools such as: motion estimation/compensation techniques, which use I, B, P frame types; Discrete Cosine Transform (DCT); quantization (Q); Variable Length Coding (VLC), Motion Compensation Prediction (MCP), etc. DCT and Q also have inverse operations, IDCT and IQ, respectively, as shown in FIGS. 2a and 2b below.

The human eye has a limited response to fine spatial detail, and is less sensitive to detail near object edges or around shot-changes. Consequently, controlled impairments introduced into the decoded picture by the bit rate reduction process should not be visible to a human observer.

Intra-frame compression is compression that reduces the amount of video information in each frame on a frame-by-frame basis. Inter-frame compression is a compression scheme, such as MPEG-2, that reduces the amount of video information by storing only the differences between a frame and those preceding it. An important application of digital signal processing (DSP) is in signal compression and decompression. The architecture of a DSP chip is designed to carry out such operations incredibly fast, processing up to tens of millions of samples per second, to provide real-time performance. That is, the ability is required to process a signal "live" as it is sampled, and then output the processed signal, for example, to a video display.

An I-frame (Intra-frame), in Inter-frame compression schemes, is the key frame, or reference video frame, that acts as a point of comparison to P-frames and B-frames, and is not reconstructed from another frame. A P-frame is the Predictive video frame that exhibits the change that occurred compared to the I-frame or P-frame before it. A B-frame is a highly compressed, Bi-directional frame that records the change that occurred between the I-frame or P-frame before and after it.

FIG. 1 is a schematic illustration of spatial and temporal redundancy 100. Spatial redundancy is seen in current frame 120. That is, pixels 125 are shown as identical. Thus, it suffices to transmit the details of the first of pixels 125, and the fact that the following three pixels are the same, without repeating their details.

Temporal redundancy is shown by the relationship between pixel 112 of previous frame 110 and pixel 122 of current frame 120. Vector 114 represents the inverse of this "movement".

FIGS. 2a and 2b are prior art detailed schematic block diagrams of a typical encoder 210 and decoder 220, respectively.

Quantization (Q) is the function of coder 210 to transmit the DCT block to decoder 220, in a bit rate efficient manner, so that it can perform the inverse transform to reconstruct the image. It has been observed that the numerical precision of the DCT coefficients may be reduced while still maintaining good image quality at decoder 220. Quantization is used to reduce the number of possible values to be transmitted, reducing the required number of bits.

The degree of quantization applied to each coefficient is weighted according to the visibility of the resulting quantization noise to a human observer. In practice, this results in the high-frequency coefficients being more coarsely quantized than the low-frequency coefficients. Note that the quantization noise introduced by the coder is not reversible in the decoder, making the coding and decoding process 'lossy'.

Coding is the serialization and coding of the quantized DCT coefficients used to exploit the likely clustering of energy into the low-frequency coefficients and the frequent occurrence of zero-value coefficients. The list of values produced by scanning is entropy coded using a variable-length code (VLC). The VLC allocates code words, which have different lengths depending upon the probability with which they are expected to occur.

These tools have been investigated and optimized in many systems, for example using digital signal processor (DSP) and Field Programmable Gate Array (FPGA) architectures, and have reached a very mature stage. Therefore, they can be implemented in real-time, give good perceptual quality, and can have a lot of installed-base equipment that can use them. However, these systems usually cause an inherent delay of several 100's msec. In some applications a much lower delay is required, e.g. a few msec.

MPEG operation is characterized by frame-by-frame processes. The encoder receives an entire frame, and then decides on how to process the frame. All the coded bits of the frame are put in a buffer, and are then transmitted to the decoder. The decoder performs a similar sequence. Each of these frame-by-frame steps is a source of delay.

Each frame is composed of two interlaced video alternating scan line fields. In field-frame operation, the first field must be transmitted completely before the second field is transmitted. This is an additional source of delay.

FIG. 2c is a prior art schematic block diagram illustrating the pixels, macroblocks and slices within a frame 230. Each slice can be decoded independently from any other slice, although macroblocks are interdependent. There are a few different possibilities for how macroblocks define a slice.

Another source of delay arises from predictive sequences. For example, in presentation display order, an I-frame may be followed by two B-frames and then a P-frame. Since the B-frames are constructed from information contained in the I-frame and P-frame, the 6-frames cannot be transmitted until the I-frame and then the P-frame are received. Thus there is a difference between the display order and the transmission order, thus introducing further delay. FIG. 2d is a prior art schematic block diagram of the prediction process for I, B and P frames 240.

A fourth source of delay is attributed to differing bit rates for I, B and P frames. The I-frames require considerable bits, B-frames have the fewest and P-frames are intermediary. The buffer is hardware, and therefore is of fixed size. Whichever frame is largest determines the minimum buffer size. Also more complex video scenes require more bits. However, the larger buffers have greater delay.

A fifth cause of delay emanates from the processing time for the encoder and decoder.

The available solutions refer to removing several of the aspects that contribute most to the coder/decoder (codes)

delay. The most problematic issue is the IBP frame type. The B frames include an inherent delay of several frames. Each frame is 40/33 msec depending on the video format Phase Alteration Line/National Television System Committee (PAL/NTSC), respectively. In addition, since each of the three frame types, I; B; and P require a substantially different number of bits, a large Video Buffer Verification (VBV) buffer must be used to achieve reasonable quality of the video.

Therefore, existing methods use P-only frame types, thereby eliminating large I-frames and small B-frames. The buffer can therefore be quite efficient. When there are frequent scene changes, this somewhat reduces the visual quality and the channel noise error-resilience. However, it enables lower delay and usually an acceptable amount of reduction in quality and resilience. This method reduces the required delay to a single frame at the encoder plus a single frame at the decoder, plus roughly a single frame to handle fluctuations in coding difficulty and real-time implementation. This amounts to 120/100 msec for PAL/NTSC respectively. The theoretic limit, assuming zero VBV buffer size and infinitely strong processing time, can go down to 80/66 msec. In practical applications it cannot go under 100 msec. This is the minimal limit since MPEG codec requires receiving the entire frame and than encoding or decoding it with a processor or other programmable logic. This delay is good enough for some applications, such as remote interviews, but is still too large for applications that require remote control of processes. The MPEG2 standard also refers to low-delay mode. However, in this mode, frames that are large are skipped and the last "small" frame is repeated until the next "small" frame appears.

Therefore, there is a need for a method that overcomes the limitations of prior art video encoders and decoders, and provides for true low-level delay in the encoding and decoding of digital video bitstreams.

SUMMARY OF THE INVENTION

Accordingly, it is a principal object of the present invention to overcome the limitations of prior art devices and provide a method that solves the need for reducing end-to-end delay in the encoding and decoding of digital video bitstreams It is another principal object of the present invention to process frames on a field-by-field basis.

It is yet another object of the present invention to process fields on a slice-by-slice basis.

A system is disclosed for compressed digital video bitstreams, in which a plurality of P-field slices are processed, wherein the system includes an encoder to encode the bits for each successive P-field slice. The system also includes a decoder buffer, where the bits enter at a fixed rate, and a decoder, which uses the extracted bits to decode each field of each frame and display each frame. The delay is reduced to under 10 msec and the buffer stays within the frame boundaries.

The present invention describes a method that can be displayed by any standard MPEG2 decoder and can reach the ultra-low-delay requirements in specifically designed MPEG2-like decoders.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIGS. 2a and 2b are prior art detailed schematic block diagrams of a typical encoder and decoder, respectively;

FIG. 2c is a prior art schematic block diagram illustrating the pixels, macroblocks and slices within a frame 230;

FIG. 2d is a prior art schematic block diagram of the prediction process for I, B and P frames 240;

DETAILED DESCRIPTION OF THE PREFERRED EMBODIMENTS

The invention will now be described in connection with certain preferred embodiments with reference to the following illustrative figures so that it may be more fully understood. References to like numbers indicate like components in all of the figures.

Figure 1:
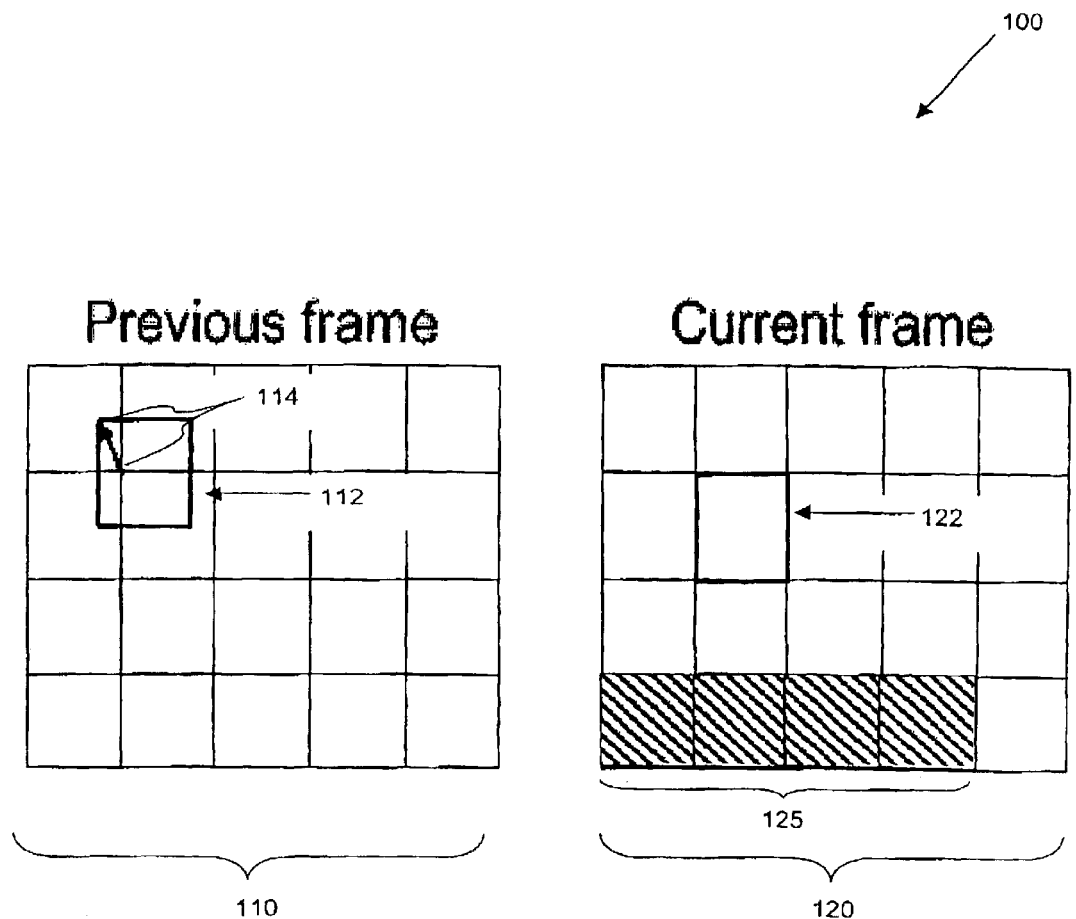
FIG. 1 is a schematic illustration of spatial and temporal redundancy.
Figure 3:
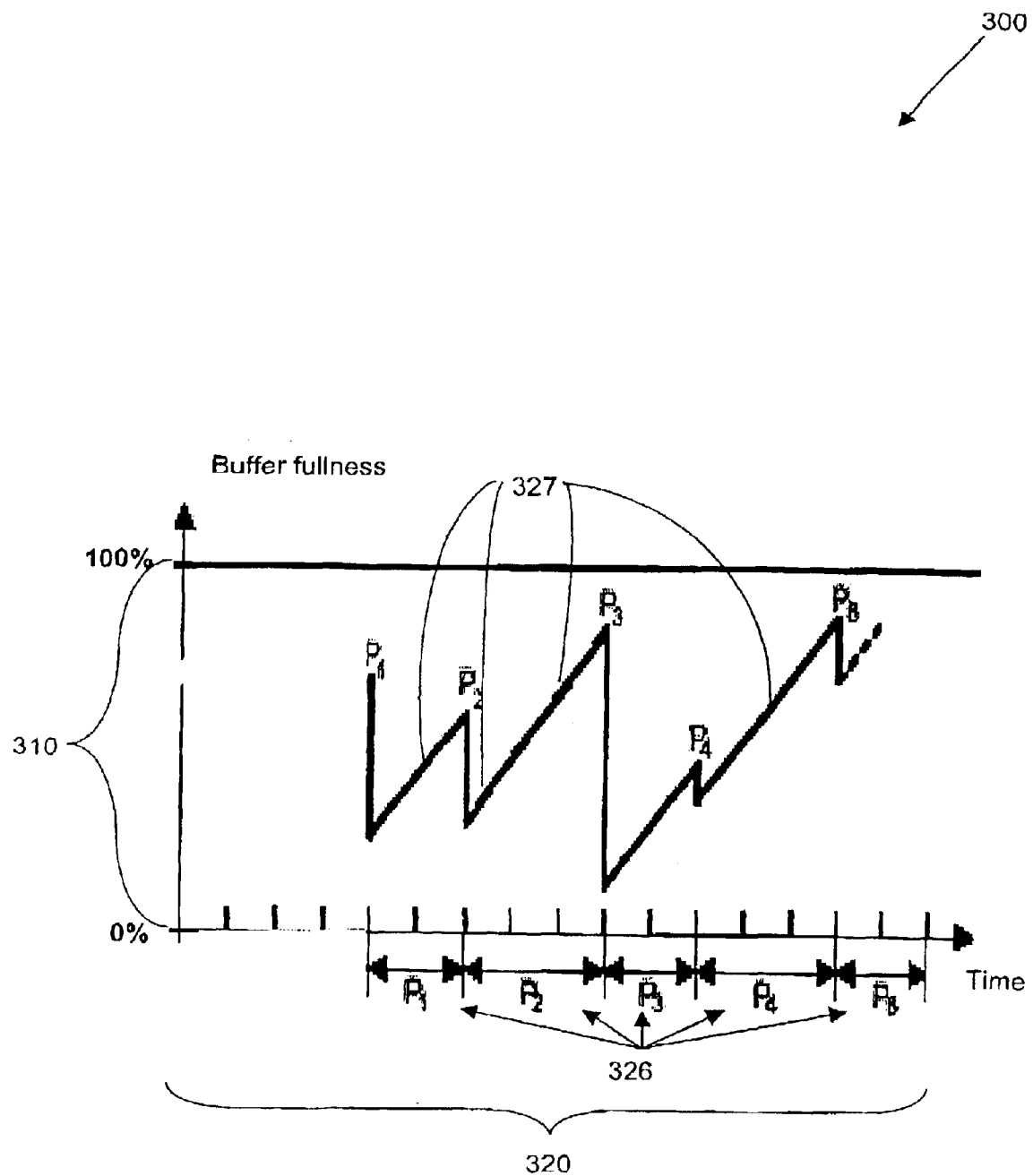
FIG. 3 is a graph illustrating the buffer fullness in percent vs. time, constructed in accordance with the principles of the present invention.

FIG. 3 is a graph 300 illustrating the buffer fullness in percent 310 vs. time 320, constructed in accordance with the principles of the present invention. The proposed method is based on slice-based (16 line units) operations and buffer-management, rather than frame-based operations and buffer management. Each P-frame is received field-by-field and slice-by-slice, wherein 5 slices, $P_1, \ldots P_5$ 326 are shown. P-frames can include I-macroblocks. FIG. 3 illustrates the buffer management in MPEG2 in constant bit-rate mode. Constant bit-rate is shown by all the diagonals 327 being straight, lines having the same slope. The bits of a slice enter the decoder buffer at a fixed bit rate and are extracted when a slice ends. Then, the decoder uses these bits to decode the slice, and afterwards to display it. Therefore, the synchronization is preferably careful and tight, in the encoder and decoder, in order to achieve an accurate display. The buffer must not overflow or underflow the given boundaries at the frame boundaries, but this might temporarily happen inside a slice.

The proposed method handles each field-slice as if it was a minor-frame. This affects the rate allocation process, which requires a more precise resource allocation. This also affects the processing, transmission and reception mechanisms. The processing of both the transmission and reception for both the encoder and the decoder should be done at the end of each slice. Since each slice is a self-contained unit, the encoder can perform this task and still be compliant to the MPEG-2 standard and therefore be decoded by any MPEG-2 standard decoder, although there can be some variation in the bitstream from the standard. However, only decoders that are aware of this process can reach the sub-frame delay. Standard MPEG2 decoders should be able to display the signal with frame delay. The proposed process delay can be decreased to a practical value of 10 msec delay. The proposed decoder can receive signal also from any standard MPEG-2 encoder and display it as any other standard decoder.

Figure 4:
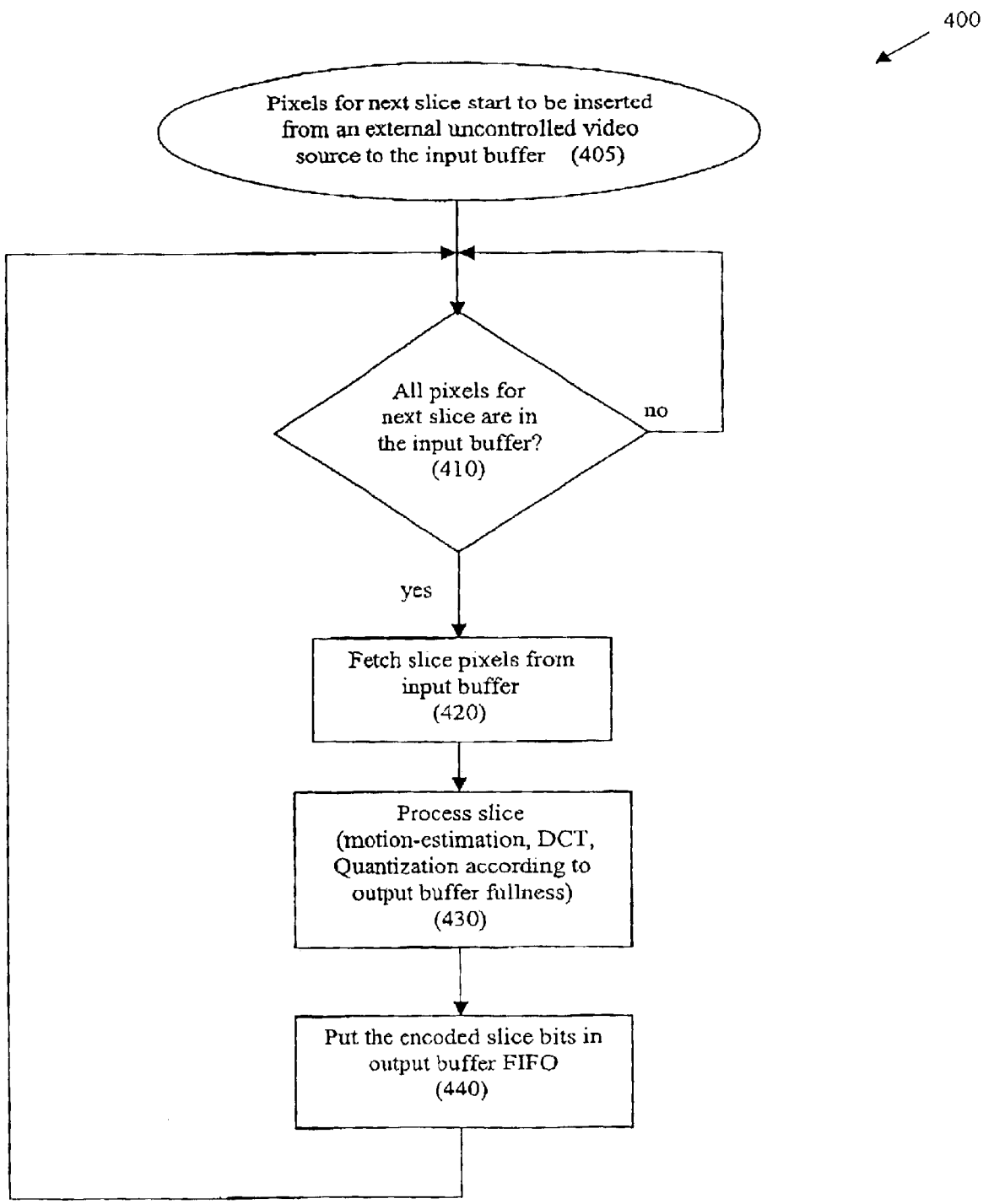
FIG. 4 is a flow chart illustrating the method for ultra-low delay video encoding, constructed in accordance with the principles of the present invention.

FIG. 4 is a flow chart illustrating the method for ultra-low delay video encoding 400, constructed in accordance with the principles of the present invention. At the start of a new P-field, the field is divided into a plurality of slices. The bits enter the decoder buffer at a fixed rate. The pixels for the next slice start to be inserted from an external uncontrolled video source to the input buffer 405. When all the pixels for the next slice are in the input buffer 410, the pixels for the slice are fetched from the input buffer 420. The slice is then processed 430. Processing preferably includes motion estimation, discrete cosine transformation (DCT) and Quantization, according to the fullness of the output buffer. The encoded slice bits are then put into the output buffer 440, according to a first-in, first-out (FIFO) procedure. I.e., the bits are continuously extracted from the output buffer to the channel at a fixed-bit rate.

Figure 5:
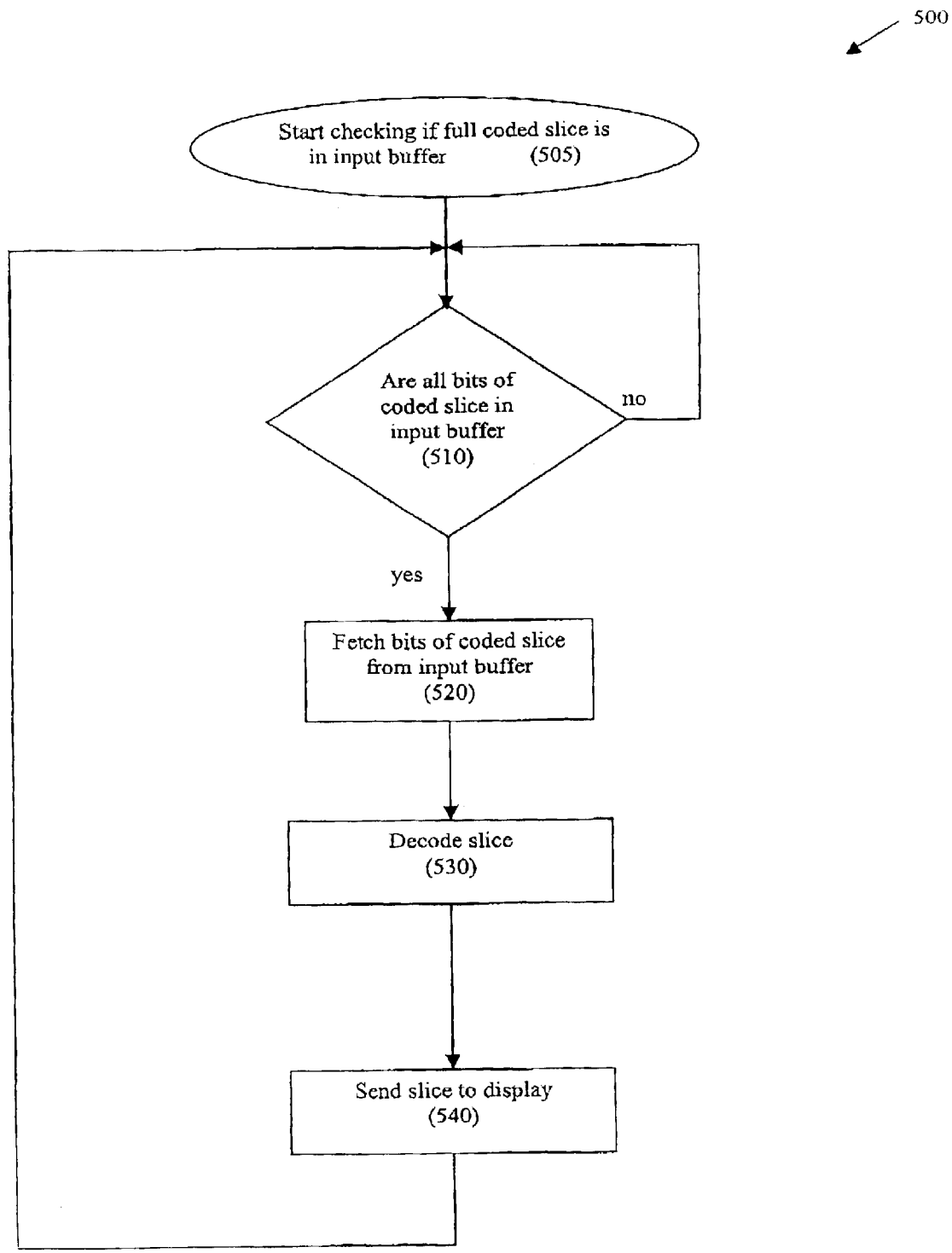
FIG. 5 is a flow chart illustrating the method for ultra-low delay video decoding constructed in accordance with the principles of the present invention.

FIG. 5 is a flow chart illustrating the method for ultra-low delay video decoding 500, constructed in accordance with the principles of the present invention. At the start of a new slice, checking is begun to see whether the full coded slice is in the input buffer 505. When all the bits of the coded slice are in the input buffer 510, the bits of the coded slice are fetched from the input buffer 520. The slice is then decoded 530. The slice is then sent to the display 540.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A system for processing a compressed digital video bitstream formatted as a plurality of P-field slices, which may be preceded by a single I-frame, the system comprising:

an encoder to encode the bits for each successive P-field slice, said encoder introducing an encoder delay component; and a decoder, which includes a buffer in which said bits are placed at a fixed rate, and which extracts said bits to decode each field-slice and display each field-slice, said decoder introducing a decoder delay component, wherein the total delay of said encoder and decoder delay components is chosen as a fixed value between 10 msec and 100 msec.

2. The system according to claim 1, wherein said encoder is compliant to the MPEG-2 standard.

3. The system according to claim 1, wherein said decoder can decode a bitstream from any standard MPEG-2 encoder.

4. The system according to claim 1, wherein said decoder can display fields as would any standard decoder.

5. A method for processing a compressed digital video bit stream formatted as a plurality of P-Field slices, which may be preceded by a single I-frame, the method comprising:

encoding of bits associated with the bitstream for each successive P-field slice, thereby introducing an encoder delay component; and decoding by placing said bits in a decoder buffer at a fixed rate, and extracting said bits to decode each P-field slice and display each P-field slice, thereby introducing a decoder delay component, wherein the total delay of said encoder and decoder delay components is chosen as a fixed value between 10 msec and 100 msec.

6. The method according to claim 5, wherein said encoder is compliant to the MPEG-2 standard.

7. The system according to claim 5, wherein said decoder can decode a bitstream from a non-compliant MPEG-2 encoder.

8. The method according to claim 5, wherein said decoder can display fields as would any standard decoder.

* * * * *